US009245048B1

(12) United States Patent
Bent et al.

(10) Patent No.: US 9,245,048 B1
(45) Date of Patent: Jan. 26, 2016

(54) PARALLEL SORT WITH A RANGED, PARTITIONED KEY-VALUE STORE IN A HIGH PERFOMANCE COMPUTING ENVIRONMENT

(71) Applicant: EMC Corporation, Hopkinton, MA (US)

(72) Inventors: John M. Bent, Los Alamos, NM (US); Sorin Faibish, Newton, MA (US); Gary Grider, Los Alamos, NM (US); Aaron Torres, Los Alamos, NM (US); Stephen W. Poole, Knoxville, TN (US)

(73) Assignees: EMC Corporation, Hopkinton, MA (US); Los Alamos National Security, LLC, Los Alamos, NM (US)

( * ) Notice: Subject to any disclaimer, the term of this patent is extended or adjusted under 35 U.S.C. 154(b) by 190 days.

(21) Appl. No.: 14/143,771

(22) Filed: Dec. 30, 2013

(51) Int. Cl.
*G06F 17/30* (2006.01)
(52) U.S. Cl.
CPC ................................ *G06F 17/30946* (2013.01)
(58) Field of Classification Search
None
See application file for complete search history.

(56) References Cited

U.S. PATENT DOCUMENTS

| 2011/0252067 A1* | 10/2011 | Marathe | G06F 17/30958 707/797 |
| 2012/0254173 A1* | 10/2012 | Graefe | G06F 17/30501 707/737 |
| 2013/0254208 A1* | 9/2013 | Hazel | G06F 17/30336 707/741 |
| 2014/0231512 A1* | 8/2014 | Onischuk | G07C 13/00 235/386 |
| 2015/0169567 A1* | 6/2015 | Singh | G06F 17/3028 707/722 |

* cited by examiner

*Primary Examiner* — Wilson Lee
(74) *Attorney, Agent, or Firm* — Ryan, Mason & Lewis, LLP

(57) ABSTRACT

Improved sorting techniques are provided that perform a parallel sort using a ranged, partitioned key-value store in a high performance computing (HPC) environment. A plurality of input data files comprising unsorted key-value data in a partitioned key-value store are sorted. The partitioned key-value store comprises a range server for each of a plurality of ranges. Each input data file has an associated reader thread. Each reader thread reads the unsorted key-value data in the corresponding input data file and performs a local sort of the unsorted key-value data to generate sorted key-value data. A plurality of sorted, ranged subsets of each of the sorted key-value data are generated based on the plurality of ranges. Each sorted, ranged subset corresponds to a given one of the ranges and is provided to one of the range servers corresponding to the range of the sorted, ranged subset. Each range server sorts the received sorted, ranged subsets and provides a sorted range. A plurality of the sorted ranges are concatenated to obtain a globally sorted result.

20 Claims, 3 Drawing Sheets

PARALLEL SORT WITH A RANGED, PARTITIONED KEY-VALUE STORE IN A HIGH PERFOMANCE COMPUTING ENVIRONMENT

STATEMENT OF GOVERNMENT RIGHTS

This invention was made under a Cooperative Research and Development Agreement between EMC Corporation and Los Alamos National Security, LLC. The United States government has rights in this invention pursuant to Contract No. DE-AC52-06NA25396 between the United States Department of Energy and Los Alamos National Security, LLC for the operation of Los Alamos National Laboratory.

CROSS-REFERENCE TO RELATED APPLICATIONS

The present application is related to U.S. patent application Ser. No. 14/143,749, entitled "Parallel Storage System With Burst Buffer Appliance for Storage of Partitioned Key-Value Store Across a Plurality of Storage Tiers;" and U.S. patent application Ser. No. 14/143,758, entitled "Partitioned Key-Value Store With One-Sided Communications for Secondary Global Key Lookup by Range-Knowledgeable Clients," each filed contemporaneously herewith and incorporated by reference herein.

FIELD

The field relates generally to data storage, and more particularly to partitioned key-value stores.

BACKGROUND

Key-value stores are a powerful tool to store and retrieve large amounts of data for activities such as data analysis. One difficulty in creating these key-value stores is the need for parallelism. The large amount of data that must be stored makes a key-value store on a single node impractical for most workloads. Thus, distributed key-value stores have been proposed for storing a partitioned key-value store (often referred to as a partitioned data store) on a number of parallel nodes.

Multidimensional Data Hashing Indexing Middleware (MDHIM) is an example of a framework for partitioned data stores. In a typical MDHIM implementation, one or more MDHIM clients run on each of the compute nodes and communicate with a plurality of MDHIM servers also running on the same or different compute nodes in a parallel file system. Each MDHIM server stores a partition of the key-value store. A given MDHIM server storing a particular sub-range of the key-value store is contacted to read or write key-values within the sub-range.

One challenge in a partitioned key-value store is the amount of key-value data that must be transferred, stored and processed. Thus, MDHIM employs low-latency Message Passing Interface (MPI) communications across the userspace of high performance computing (HPC) compute nodes to create a single virtual key-value store across a set of local key-value stores using ordered key-ranges.

A set of unsorted input files must often be read and sorted by key in a key-value store. The unsorted input files comprise a set of key-value entries. A typical approach is to have a set of reader threads read each individual input file and perform a local sort. The reader threads then use a set of "split" marks to send subsets of their locally sorted entries to a different writer thread that accepts these subsets from many reader threads. The writer threads then perform a sort of the received subsets and write the result to a new file. The set of new files can be concatenated to obtain a globally sorted result.

While such sorting techniques effectively sort the set of unsorted input files, a need remains for improved sorting techniques that perform a parallel sort using a ranged, partitioned key-value store in a high performance computing (HPC) environment.

SUMMARY

Illustrative embodiments of the present invention provide improved sorting techniques that perform a parallel sort using a ranged, partitioned key-value store in a high performance computing (HPC) environment. In one embodiment, a plurality of input data files comprising unsorted key-value data in a partitioned key-value store are sorted. The partitioned key-value store comprises a range server for each of a plurality of ranges in the partitioned key-value store. Each input data file has an associated reader thread, wherein each reader thread reads the unsorted key-value data in the corresponding input data file and performs a local sort of the unsorted key-value data to generate sorted key-value data. A plurality of sorted, ranged subsets of each of the sorted key-value data are generated based on the plurality of ranges, such that each of the sorted, ranged subsets corresponds to a given one of the ranges. Each of the plurality of sorted, ranged subsets are provided to one of the range servers corresponding to the range of the sorted, ranged subset, wherein each of the range servers sorts the received sorted, ranged subsets and provides a sorted range. A plurality of the sorted ranges are concatenated to obtain a globally sorted result.

In one exemplary embodiment, the partitioned key-value store is based on a Multidimensional Data Hashing Indexing Middleware (MDHIM) framework. In addition, the partitioned key-value store optionally employs Message Passing Interface (MPI) communications. The reader thread is associated, for example, with an MDHIM client. The range servers comprise, for example, MDHIM range servers.

As noted above, illustrative embodiments described herein provide significant improvements relative to conventional arrangements. In some of these embodiments, use of a ranged, partitioned key-value store to perform a parallel sort in a high performance computing environment provides significant performance improvements.

DETAILED DESCRIPTION

Illustrative embodiments of the present invention will be described herein with reference to exemplary partitioned data stores and associated clients, servers, storage arrays and other processing devices. It is to be appreciated, however, that the invention is not restricted to use with the particular illustrative partitioned data stores and device configurations shown. Accordingly, the terms "partitioned data store" and "partitioned key-value store" as used herein are intended to be broadly construed.

Aspects of the present invention provide improved sorting techniques that perform a parallel sort using a ranged, partitioned key-value store in a high performance computing (HPC) environment. While the exemplary embodiments of the present invention employ MDHIM, other MPI-Linked partitioned data stores can be employed, as would be apparent to a person of ordinary skill in the art.

U.S. patent application Ser. No. 14/143,749, entitled "Parallel Storage System With Burst Buffer Appliance for Storage of Partitioned Key-Value Store Across a Plurality of Storage Tiers;" filed contemporaneously herewith, describes a framework for a ranged distributed key-value store from multiple local key-value stores bound by an HPC interconnect such as MPI. Aspects of the present invention recognize that HPC interconnects such as MPI efficiently distribute information.

Figure 1:
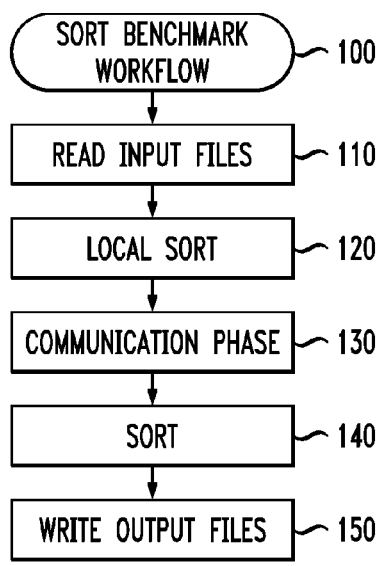
FIG. 1 is a flow chart illustrating an exemplary implementation of a conventional sort benchmark workflow.

The sort benchmark is a well-known tool to benchmark a system for large parallel input/output (JO). A set of unsorted input files must be read and then sorted by key. The file content is a set of key-value entries to be sorted. A typical approach is to have a set of threads read each individual input file and do a local sort. The threads then use a set of "split" marks to send subsets of their locally sorted entries to a different thread which accepts these subsets from many other threads. Those threads then do a sort of all those subsets and write the result to a new file. The set of new files can be concatenated to make a globally sorted result FIG. 1 is a flow chart illustrating an exemplary implementation of a conventional sort benchmark workflow 100. As shown in FIG. 1, the exemplary conventional sort benchmark workflow 100 initially reads a set of input files during step 110. A local sort is then performed on the input files during step 120. A communication phase occurs during step 130, followed by an additional sort during step 140, in a known manner. The output files are written during step 150.

Aspects of the present invention recognize that the bottleneck of the conventional approach shown in FIG. 1 is the read, write phase, as well as the communication phase. The sort phases are typically negligible provided that the data fits in memory. MapReduce on cloud systems have been proposed for performing such a parallel sort. Generally, a set of mappers read the input files and send the splits to a set of reducers. The reducers sort all of the splits they receive from the mappers and write the output files.

Aspects of the present invention recognize that a ranged partitioned key-value store, such as an MDHIM partitioned key-value store, can be used to efficiently sort large amounts of information. Generally, each compute node in a high performance computing (HPC) environment reads an unsorted input set. The partitioned key-value store is initialized and a local sort is performed. The list IO is used to send the set of key-values to the appropriate range server. The set of local stores are sorted locally and the ranged, partitioned key-value store will provide the global sorting. HPC supercomputers generally perform better than typical cloud compute systems. Aspects of the present invention thus recognize that MDHIM and other partitioned key-value stores are optimized for HPC supercomputers.

Figure 2:
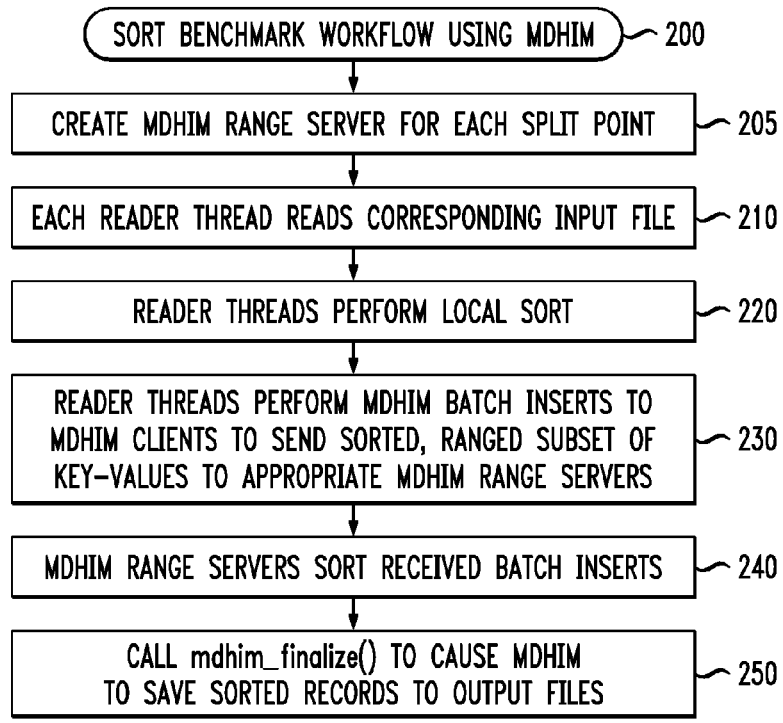
FIG. 2 is a flow chart illustrating an exemplary implementation of a sort benchmark workflow that incorporates aspects of the present invention.

FIG. 2 is a flow chart illustrating an exemplary implementation of a sort benchmark workflow 200 using MDHIM that incorporates aspects of the present invention. As shown in FIG. 2, the exemplary sort benchmark workflow 200 initially creates an MDHIM range server during step 205 for each split point (partition) (for example, using an mdhim_init command). Each reader thread then reads the corresponding input file during step 210 and performs a local sort during step 220.

The reader threads then perform MDHIM batch inserts to MDHIM clients during step 230 to send a sorted, ranged subset of key-values to the appropriate MDHIM range servers, as discussed further below in conjunction with FIG. 3. The MDHIM range servers sort the received batch inserts during step 240.

An mdhim_finalize( ) command is issued during step 250 by the exemplary sort benchmark workflow 200 to cause MDHIM to save the sorted records to output files. Thus, the exemplary sort benchmark workflow 200 leverages the scatter-gather performance of HPC communications and interconnects. The concatenated output files form a globally sorted set of key-value pairs.

Figure 3:
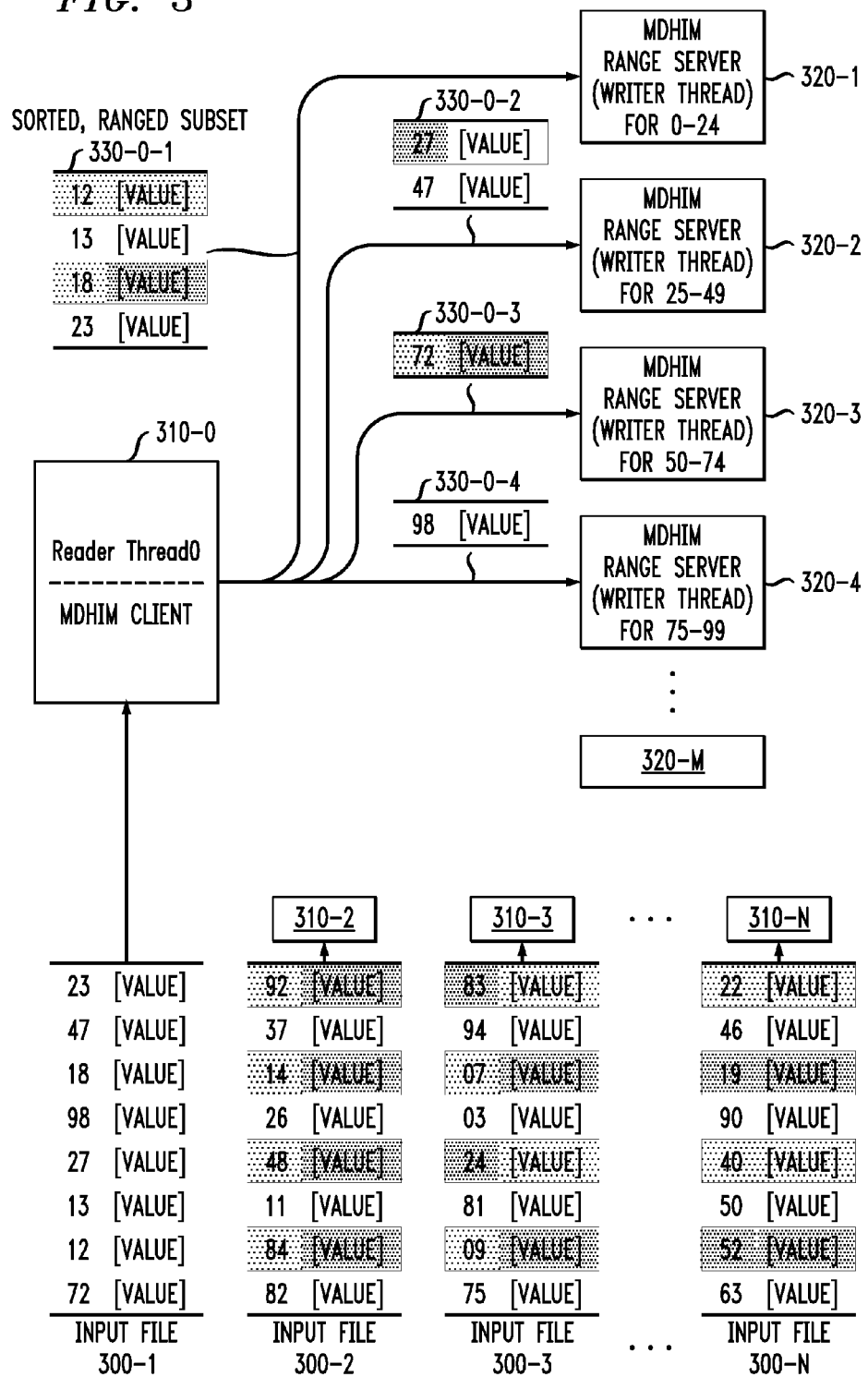
FIG. 3 illustrates batch inserts performed by the exemplary sort benchmark workflow of FIG. 2 to send sorted, ranged subset of key-values to the appropriate MDHIM range servers.

FIG. 3 illustrates the MDHIM batch inserts that are performed by the exemplary sort benchmark workflow 200 during step 230 to send the sorted, ranged subset of key-values to the appropriate MDHIM range servers. As shown in FIG. 3, each unsorted input file 300-1 through 300-N is read by a reader thread of a corresponding MDHIM client 310-1 through 310-N. The exemplary reader threads employ split points 0-24, 25-49, 50-74, 75-99 and instantiate MDHIM servers 320-1 through 320-M with those ranges. As discussed above in conjunction with FIG. 2, the reader threads first perform a local sort, and then perform a batch insert of the locally sorted data into MDHIM clients 310. There will be an MDHIM server 320 for each range (often called split points).

For example, as shown in FIG. 3, Reader Thread0 associated with MDHIM client 310-0 reads input file 300-1 and generates a sorted, ranged subset 330-0-1 for the first range (split point) that is sent to MDHIM server 320-1; a sorted, ranged subset 330-0-2 for the second range (split point) that is sent to MDHIM server 320-2; a sorted, ranged subset 330-0-3 for the third range (split point) that is sent to MDHIM server 320-3; a sorted, ranged subset 330-O-4 for the fourth range (split point) that is sent to MDHIM server 320-4; and a sorted, ranged subset 330-0-M for the Mth range (split point) that is sent to MDHIM server 320-M.

Figure 4:
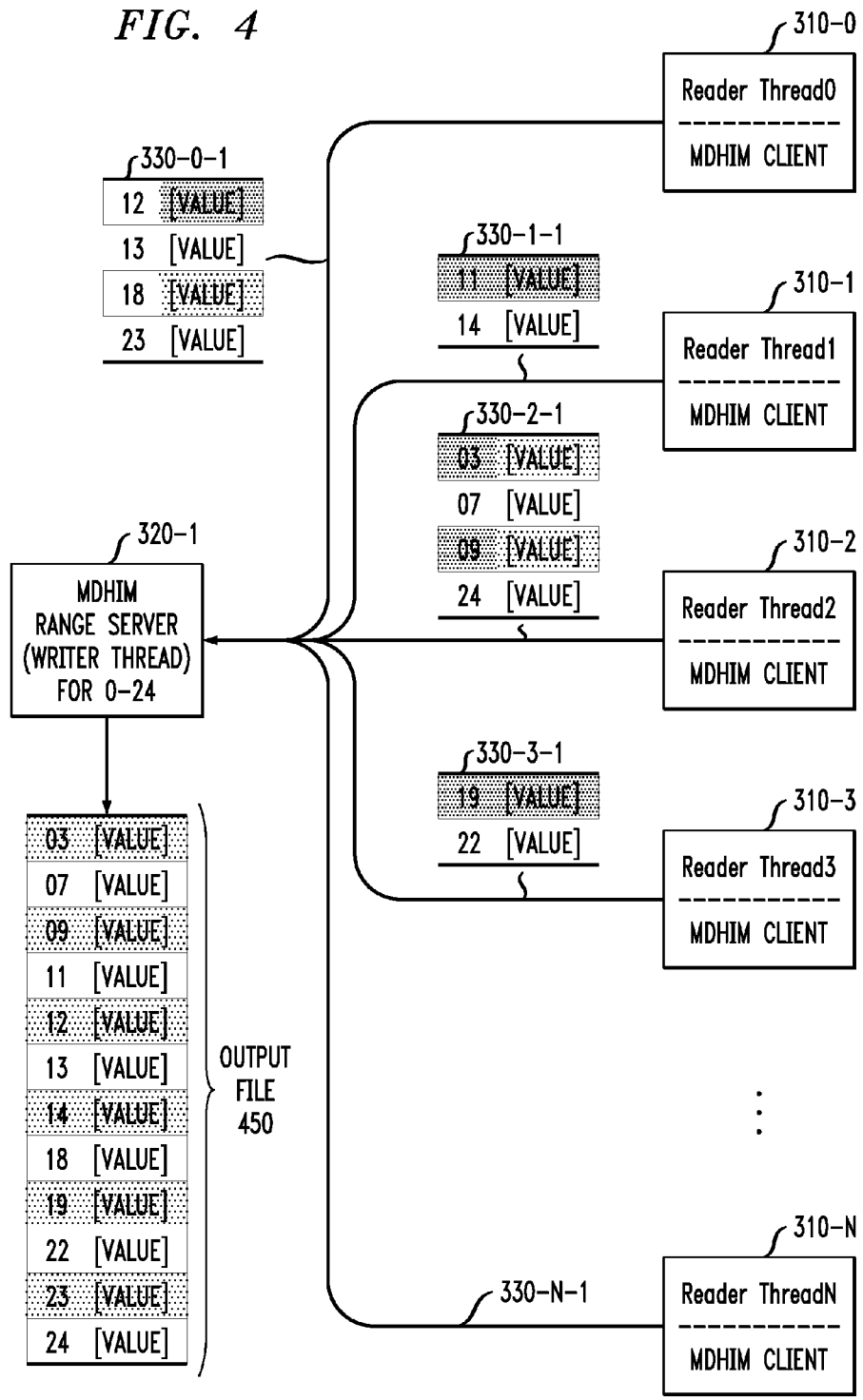
FIG. 4 illustrates the server-side of the batch inserts performed by the exemplary sort benchmark workflow of FIG. 2.

FIG. 4 illustrates the server-side of the MDHIM batch inserts that are performed by the exemplary sort benchmark workflow 200 during step 230. FIG. 4 illustrates the receipt of the sorted, ranged subset of key-values from the various MDHIM clients by one exemplary range server 320-1. As the MDHIM range servers 320 accept the batched key-values, they are placed into the sorted MDHIM local store which creates a sorted local file. When all the output files are concatenated, they form a global sort of all of the input files.

As shown in FIG. 4, the exemplary range server 320-1 receives a first sorted, ranged subset 330-0-1 from Reader Thread0 associated with MDHIM client 310-0; a second sorted, ranged subset 330-1-1 from Reader Thread1 associated with MDHIM client 310-1; a third sorted, ranged subset 330-2-1 from Reader Thread2 associated with MDHIM client 310-2; a fourth sorted, ranged subset 330-3-1 from Reader Thread3 associated with MDHIM client 310-3; and an N+1$^{th}$ sorted, ranged subset 330-N-1 from Reader ThreadN associated with MDHIM client 310-N.

As previously indicated, the sort benchmark indicates how much data can be sorted in a given amount of time, such as one minute. The amount of data that can be sorted is limited to how much data can be read and written in that minute. The time that can be spent on read and write is the time left over after the time required for communication and sorting. A conservative estimate is 15 seconds for communication and five seconds for sorting. This leaves 20 seconds for reading and 20 seconds for writing.

For a supercomputer projected to do IO at 17 TB/s (such as those anticipated to be available in 2015), in 1 minute approximately 340 TB of data can be sorted (20 seconds of IO multiplied by 17 TB/s).

For a more detailed discussion of MDHIM, see, for example, James Nunez et al., "Multidimensional Data Hashing Indexing Metadata/Middleware (MDHIM) Project," Ultrascale Systems Research Center, High Performance Computing Systems Integration (2012-2013), incorporated by reference herein.

The networks used herein may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks. The term "network" as used herein is therefore intended to be broadly construed, so as to encompass a wide variety of different network arrangements, including combinations of multiple networks possibly of different types.

One or more of the devices and nodes described herein may comprise a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination.

The memory and other memories disclosed herein may be viewed as examples of what are more generally referred to as "computer program products" storing executable computer program code.

One or more devices described herein optionally further comprise network interface circuitry. The network interface circuitry allows the corresponding device to communicate over a network with other devices. The network interface circuitry may comprise, for example, one or more conventional transceivers.

One or more devices described herein may optionally be implemented at least in part in the form of software that is stored in memory and executed by a processor.

The devices described herein comprising processor, memory and network interface components as described above is an example of what is more generally referred to herein as a "processing device." Although exemplary clients and servers are shown in the FIGS. 3 and 4, a given partitioned key-value store in other embodiments may comprise a different number of applications, servers and/or clients.

It is to be appreciated that the particular operations and associated messaging illustrated herein are exemplary only, and numerous other types of operations and messaging may be used in other embodiments.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the partitioned key-value stores of the present invention. Such components can communicate with other elements of the partitioned key-value store over any type of network or other communication media.

As indicated previously, components of a partitioned key-value store as disclosed herein can be implemented at least in part in the form of one or more software programs stored in memory and executed by a processor of a processing device. A memory having such program code embodied therein is an example of what is more generally referred to herein as a "computer program product."

The ranged, partitioned key-value store or portions thereof may be implemented using one or more processing platforms each comprising a plurality of processing devices. Each such processing device may comprise processor, memory and/or network interface components.

As indicated above, parallel-sort functionality such as that described in conjunction with FIGS. 2-4 can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware.

It should again be emphasized that the above-described embodiments of the invention are presented for purposes of illustration only. Many variations and other alternative embodiments may be used. For example, the disclosed techniques are applicable to a wide variety of other types and arrangements of partitioned key-value stores and associated clients, servers and other processing devices that can benefit from the parallel sort functionality as described herein. Also, the particular configurations of system and device elements shown in FIGS. 2-4 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for sorting a plurality of input data files comprising unsorted key-value data in a partitioned key-value store comprising a range server for each of a plurality of ranges in said partitioned key-value store, said method comprising:
    wherein each of said plurality of input data files has an associated reader thread, wherein each reader thread reads said unsorted key-value data in said corresponding input data file and performs a local sort of said unsorted key-value data to generate sorted key-value data;
    generating a plurality of sorted, ranged subsets of each of said sorted key-value data based on said plurality of ranges, such that each of said sorted, ranged subsets corresponds to a given one of said ranges;
    providing each of said plurality of sorted, ranged subsets to one of said range servers corresponding to said range of said sorted, ranged subset, wherein each of said range servers sorts said received sorted, ranged subsets and provides a sorted range; and
    concatenating a plurality of said sorted ranges to obtain a globally sorted result.

2. The method of claim 1, wherein said step of providing each of said plurality of sorted, ranged subsets to one of said range servers comprises a batch insert operation.

3. The method of claim 1, wherein said partitioned key-value store is based on a Multidimensional Data Hashing Indexing Middleware (MDHIM) framework.

4. The method of claim 1, wherein said partitioned key-value store employs Message Passing Interface (MPI) communications.

5. The method of claim 1, wherein said reader thread is associated with an MDHIM client.

6. The method of claim 1, wherein said step of generating a plurality of sorted, ranged subsets of each of said sorted key-value data is performed by said reader thread.

7. The method of claim 1, wherein said range servers comprise MDHIM range servers.

8. An apparatus for sorting a plurality of input data files comprising unsorted key-value data in a partitioned key-value store comprising a range server for each of a plurality of ranges in
said partitioned key-value store, the apparatus comprising:
a memory; and
at least one hardware device, coupled to the memory, operative to implement the following steps:
wherein each of said plurality of input data files has an associated reader thread, wherein each reader thread reads said unsorted key-value data in said corresponding input data file and performs a local sort of said unsorted key-value data to generate sorted key-value data;
generating a plurality of sorted, ranged subsets of each of said sorted key-value data based on said plurality of ranges, such that each of said sorted, ranged subsets corresponds to a given one of said ranges;
providing each of said plurality of sorted, ranged subsets to one of said range servers corresponding to said range of said sorted, ranged subset, wherein each of said range servers sorts said received sorted, ranged subsets and provides a sorted range; and
concatenating a plurality of said sorted ranges to obtain a globally sorted result.

9. The apparatus of claim 8, wherein said plurality of sorted, ranged subsets are provided to one of said range servers using a batch insert operation.

10. The apparatus of claim 8, wherein said partitioned key-value store is based on a Multidimensional Data Hashing Indexing Middleware (MDHIM) framework.

11. The apparatus of claim 8, wherein said partitioned key-value store employs Message Passing Interface (MPI) communications.

12. The apparatus of claim 8, wherein said reader thread is associated with an MDHIM client.

13. The apparatus of claim 8, wherein said plurality of sorted, ranged subsets of each of said sorted key-value data are generated by said reader thread.

14. The apparatus of claim 8, wherein said range servers comprise MDHIM range servers.

15. An article of manufacture for sorting a plurality of input data files comprising unsorted key-value data in a partitioned key-value store comprising a range server for each of a plurality of ranges in said partitioned key-value store, the article of manufacture comprising a non-transitory machine readable recordable storage medium containing one or more programs which when executed implement the steps of:
wherein each of said plurality of input data files has an associated reader thread, wherein each reader thread reads said unsorted key-value data in said corresponding input data file and performs a local sort of said unsorted key-value data to generate sorted key-value data;
generating a plurality of sorted, ranged subsets of each of said sorted key-value data based on said plurality of ranges, such that each of said sorted, ranged subsets corresponds to a given one of said ranges;
providing each of said plurality of sorted, ranged subsets to one of said range servers corresponding to said range of said sorted, ranged subset, wherein each of said range servers sorts said received sorted, ranged subsets and provides a sorted range; and
concatenating a plurality of said sorted ranges to obtain a globally sorted result.

16. The article of manufacture of claim 15, wherein said step of providing each of said plurality of sorted, ranged subsets to one of said range servers comprises a batch insert operation.

17. The article of manufacture of claim 15, wherein said partitioned key-value store is based on a Multidimensional Data Hashing Indexing Middleware (MDHIM) framework.

18. The article of manufacture of claim 15, wherein said partitioned key-value store employs Message Passing Interface (MPI) communications.

19. The article of manufacture of claim 15, wherein said reader thread is associated with an MDHIM client and wherein said range servers comprise MDHIM range servers.

20. The article of manufacture of claim 15, wherein said step of generating a plurality of sorted, ranged subsets of each of said sorted key-value data is performed by said reader thread.

* * * * *